United States Patent [19]

Hadavi et al.

[11] Patent Number: 5,170,355
[45] Date of Patent: Dec. 8, 1992

[54] APPARATUS AND A METHOD FOR CONTROLLING THE RELEASE OF JOBS FROM A POOL OF PENDING JOBS INTO A FACTORY

[75] Inventors: Khosrow Hadavi, Pennington; Maryam S. Shahraray, Freehold, both of N.J.

[73] Assignee: Siemens Corporate Research, Inc., Princeton, N.J.

[21] Appl. No.: 534,778

[22] Filed: Jun. 7, 1990

Related U.S. Application Data

[62] Division of Ser. No. 284,165, Dec. 14, 1988, Pat. No. 4,956,784.

[51] Int. Cl.⁵ .............................................. G06F 15/00
[52] U.S. Cl. ..................................... 364/468; 364/403
[58] Field of Search ................ 364/403, 401, 468, 478

[56] References Cited

U.S. PATENT DOCUMENTS

| | | | |
|---|---|---|---|
| 4,459,663 | 7/1984 | Dye | 364/408 |
| 4,580,207 | 4/1986 | Arai et al. | 364/468 |
| 4,852,001 | 7/1989 | Tsushima et al. | 364/468 |
| 4,866,628 | 9/1989 | Natarajan | 364/468 |
| 4,887,218 | 12/1989 | Natarajan | 364/468 |
| 4,896,269 | 1/1990 | Tong | 364/468 |
| 4,956,784 | 9/1990 | Hadavi et al. | 364/468 |

Primary Examiner—Jerry Smith
Assistant Examiner—Jim Trammell
Attorney, Agent, or Firm—Adel A. Ahmed

[57] ABSTRACT

A method is disclosed for controlling the release of jobs from a pool of pending jobs into a factory, which includes a plurality of machines processing jobs-in-progress, which comprises the following steps. First, a continuity index (CI) is calculated for one of the jobs in the job pool, which is related to the total amount of processing time required by that job, and the anticipated time to finish that job. Second, a mean continuity index (MCI) is calculated related to the CI of all of the jobs processed by the factory in a predetermined period of time. Third, a lower range ($r_1$) and an upper range ($r_2$) are calculated which are related to the utilization factor of the machines and the fraction of jobs which are on time. Finally, a job is released from job pool into said factory if:

$$MCI - r_1 \leq CI \leq MCI + r_2$$

otherwise, the steps are repeated for the other jobs remaining in the job pool.

5 Claims, 2 Drawing Sheets

APPARATUS AND A METHOD FOR CONTROLLING THE RELEASE OF JOBS FROM A POOL OF PENDING JOBS INTO A FACTORY

This is a division of application Ser. No. 07/284,165 filed Dec. 14, 1988 and now U.S. Pat. No. 4,956,784.

The present invention relates to apparatus and a method for controlling the release of orders into a factory, such as, for example, a job-shop or a flow-shop type of factory.

Shop floor scheduling is an important task in managing a production system. Various, sometimes conflicting, objectives must be considered, for example: maximizing throughput; minimizing the average time orders spend in the factory, which reduces the amount of work-in-progress (WIP); maximizing the number of delivery dates met; maintaining inventory at a reasonable level; and maximizing the utilization of the resources. One aspect of shop floor scheduling is controlling the release of pending jobs onto the shop floor. This aspect is called lot release. Another aspect of shop floor scheduling is controlling jobs already on the shop floor. This aspect is called lot dispatching, and is concerned with which lot of WIP is to be processed next when a machine becomes available.

While much research has been performed in lot dispatching, the control rules developed have generally assumed that the release of jobs to the shop floor has been random, commonly, a Poisson random process. There are, however, other approaches to lot release.

One such approach is called uniform starting interval. The uniform starting interval approach releases jobs onto the shop floor at fixed intervals. Throughput of the factory is controlled by varying the interval between the release of jobs. Another approach is called work load regulation. The work load regulation approach monitors the sum of the remaining processing time at the bottleneck resources for all jobs in the shop. When this sum falls below a critical value, a new job is released onto the shop floor. Throughput may be controlled by changing the critical value. A third approach is called fixed WIP. The fixed WIP approach maintains the number of jobs in the system to be constant. A new job is released whenever a finished job leaves the shop floor. Throughput is controlled by adjusting the constant WIP level.

In the article, "Closed-Loop Job Release Control for VLSI Circuit Manufacturing," by C. R. Glassey et al., published in the IEEE Transactions on Semiconductor Manufacturing, vol. 1, no. 1, 1988, pages 36–46, it is suggested that lot release control pays a more significant role than lot dispatching in terms of effective shop floor scheduling. In addition, more and more factories are using computers to aid in shop floor scheduling. Thus, an effective lot release method, which may be implemented on a computer system, if required, is desirable, in order to increase the efficiency of shop floor schedules.

In accordance with principles of the present invention, a method for controlling the release of jobs from a pool of pending jobs into a factory, which includes a plurality of machines processing jobs-in-progress in response to management objectives, comprises the following steps. First, calculate a continuity index (CI) for one of the jobs in the job pool, which is related to the total amount of processing time required by that job, and the anticipated time to finish that job. Second, calculate a mean continuity index (MCI) related to an operational parameter of the factory. Third, calculate a lower range ($r_1$) and an upper range ($r_2$) related to the management objectives. Finally, release the job in the job pool into the factory if:

$$MCI - r_1 \leq CI \leq MCI + r_2.$$

Figure 1:
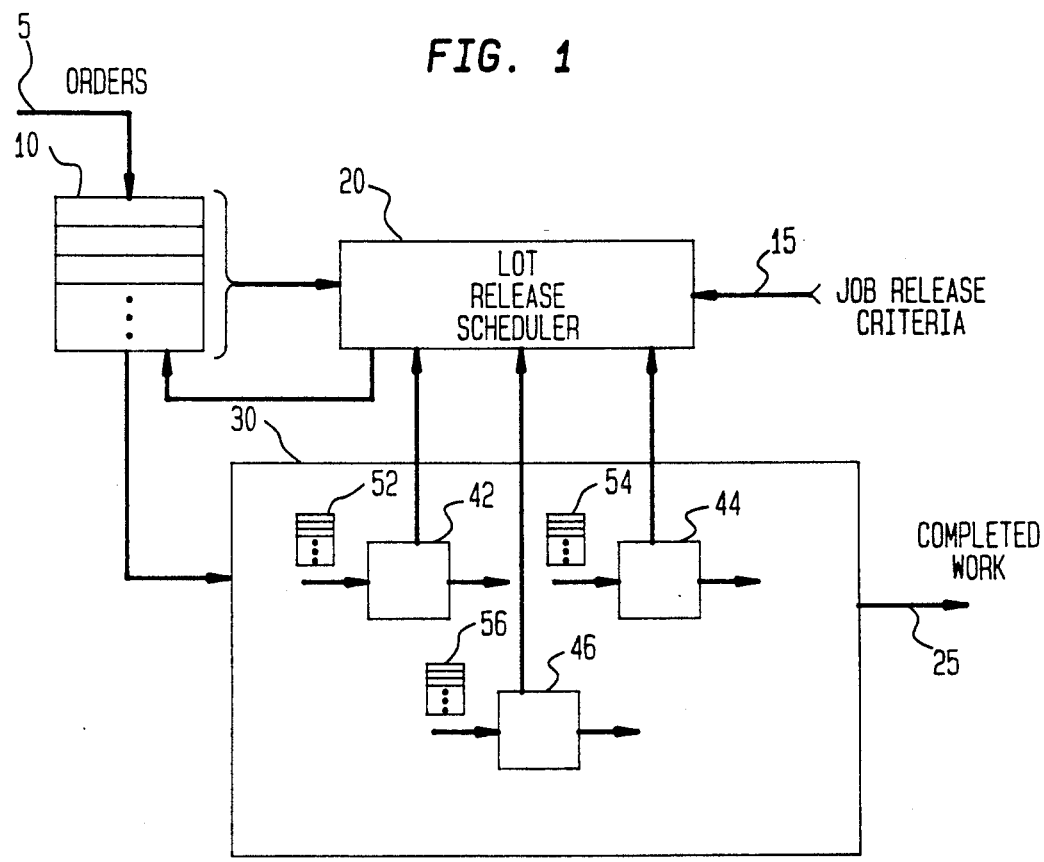
FIG. 1 is a block diagram of a factory implementing the job release method according to the present invention.

FIG. 1 is a block diagram representing a factory, such as a job-shop, in which jobs are allocated to machines in random order; or a flow shop, in which jobs are allocated to machines in the same order for each lot of WIP. In FIG. 1, orders received from customers (not shown) are represented by an input terminal 5. The orders received are saved in a job pool 10. Information about all of the orders in job pool 10 is supplied to a lot release scheduler 20. The lot release scheduler 20 controls which of the available pending jobs in job pool 10 is next to be released into the factory. The released order is supplied to the shop floor 30. Shop floor 30 includes a plurality of machines, represented in FIG. 1 by machines 42, 44 and 46, which are processing jobs-in-progress. (The shop floor may, of course, include more than the three machines illustrated in FIG. 1.) Individual lots of WIP are routed among the machines by known lot dispatching methods. Completed work leaves the shop floor, as indicated by output terminal 25. This work may be sent to a shipping dock (not shown) whence it will be shipped to the ordering customer.

During the lot dispatching, certain machines may develop waiting queues in front of them. These machines may be deemed bottlenecks. It has been found that the throughput of a factory is limited by such bottlenecks. The waiting queues for the illustrated machines 42, 44 and 46 are represented by the lists 52, 54 and 56, respectively. The state of the queues may be reported to the lot release scheduler 20 by the machines 42 to 46. (Other information may also be reported to the lot release scheduler 20 from the machines 42 to 46, such as whether the machine is currently inoperative or when it is to be shut down for preventative maintenance.) In addition, job release criteria, from, for example, management personnel (not shown), represented by input terminal 15, are supplied to the lot release scheduler 20.

Figure 2:
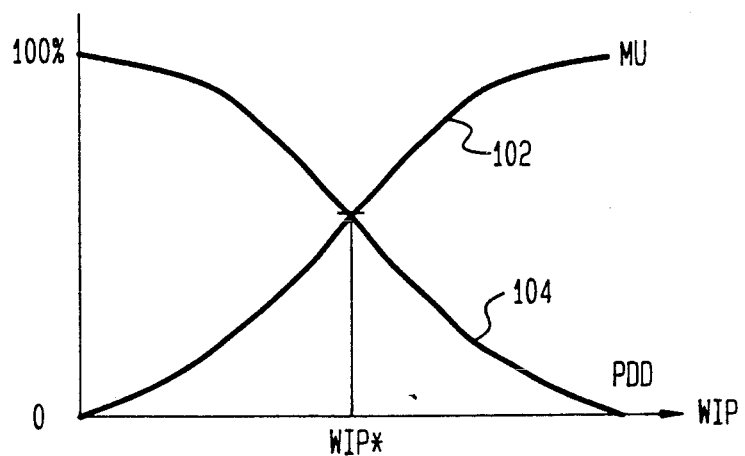
FIG. 2 is a diagram illustrating the relationship of machine utilization and number of jobs on time to the amount of WIP in a factory.

Management criteria may, for example, include machine utilization and job on-time objectives. FIG. 2 illustrates the relationships of the percentage of machine utilization (MU) and percentage of orders on-time in meeting their due dates (PDD) to the amount of WIP. When there is a relatively small amount of WIP, represented in the left-hand portion of the figure, then the percentage of jobs meeting their due dates (PDD) is high, but the machine utilization (MU) will be small. On the other hand, when there is a relatively large amount of WIP, represented in the right-hand portion of the figure, then machine utilization (MU) is nearly full, but the percentage of jobs meeting their due dates (PDD) is very low because of the overloaded shop floor conditions. There is an optimal amount of WIP, designated as WIP*, for which optimal performance, in terms of MU and PDD, is obtained. In FIG. 2, this optimal amount of WIP is illustrated as being at the intersection of the two curves representing MU and PDD, respectively. This optimal amount of WIP may, however, be at some other location, depending upon management objectives.

In operation, the lot release scheduler 20 analyses the information supplied to it, according to the method of the present invention, and either releases a job which will most likely result in fulfilling the management objectives or does not release any job. The method of the present invention emphasizes the notion that no job should be released to the shop floor 30 unless there is a good chance of being processed while on the shop floor 30. This involves forecasting future events. Discrete simulation may be used to provide such forecasting, however, simulation is time-consuming and expensive. Instead of such simulations, the present invention provides a quick answer to the question of whether a particular job should be released to the shop floor 30.

To provide this answer, an index, called herein a continuity index and designated CI, is calculated for each pending job in the job pool 10. The CI for a particular job in the job pool 10 measures how continuously the order would actually be processed if that job were to be released to the shop floor 30 at that time. The CI is determined by the following steps.

First, the job is analyzed by the lot release scheduler 20 to estimate the total amount of actual processing time would be required by the job. Second, the lot release scheduler 20 determines which machines (e.g. 42 to 46) would be required to perform processing on the job, the order of processing, and approximately when that job would be available to the machines. The information from the queues 52 to 56 of the machines 42 to 46, respectively, is also supplied to the lot release scheduler 20. This allows the lot release scheduler 20 to estimate the amount of time that the job being analyzed would spend waiting for the machines which would process it. From this information, the anticipated time which would be required to complete the job is estimated. This estimated time includes both processing time and time spent waiting in the queues (e.g. 52 to 56) of the machines (e.g. 42 to 46, respectively). The CI is then calculated as the ratio:

$$CI = \frac{\text{Total processing time}}{\text{Total time to complete}} \quad (1)$$

If this ratio is small, then an anticipated relatively large amount of time will be spent waiting in machine queues, indicating that the machine utilization is high, but that the factory may be overloaded and more job due dates may be missed. As this ratio grows larger, the job will spend less time waiting, indicating that job due dates are more likely to be met, but that machine utilization is lower. If this ratio is within an acceptable range, then the lot release scheduler 20 releases the order onto the shop floor 30. The continuity index may, therefore, be thought of as a measurement of WIP as represented on FIG. 2.

The job release criteria from management at input terminal 15, and operation of the factory in general, controls what is an acceptable range for CI. Continuing the above example, management objectives may be expressed in terms of machine utilization and due date requirements. Given this information, a range of CI may be calculated and pending jobs whose CI is within this range will be released onto the shop floor 30, while those whose CI is not within this range will be retained in the job pool 10. Alternatively, if optimal values of machine utilization and percentage of on-time orders are required, then the range of acceptable CIs may be dynamically updated based, for example, on historical performance data.

Figure 3:
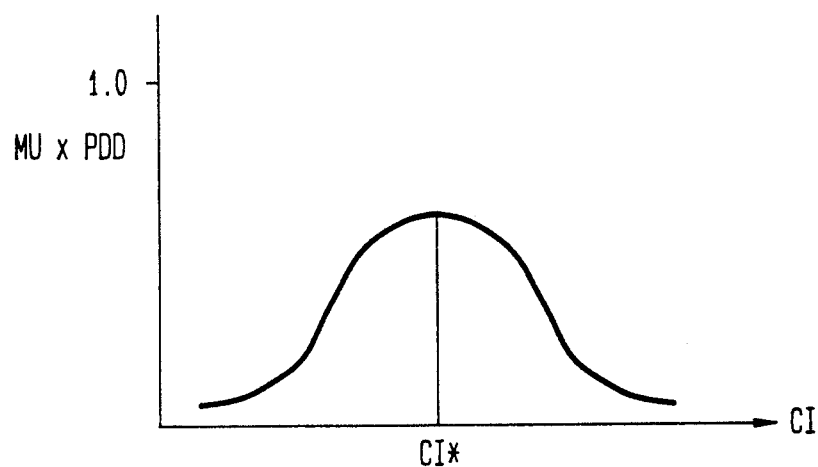
FIG. 3 is a diagram illustrating the relationship of the product of machine utilization and number of jobs on time to the continuity index, calculated according to the method of the invention.

A curve for a factory, relating an operational parameter, such as the machine utilization and percentage of jobs meeting their due dates, to the continuity index, designated a characteristic curve, may be developed. FIG. 3 illustrates such a curve. FIG. 3, shows the relationship of the product of MU×PDD to the CI. The shape of the curve may be deduced from FIG. 2 because CI is representative of the amount of WIP, as described above. There is an optimum CI, designated CI*, for which the product MU×PDD is maximized. It is obvious that the average CI for all jobs should be CI*, in order to optimize the management objectives.

Each job released by the lot release scheduler 20 should contribute to the average CI in a way that is consistent with management objectives. Further it should be noted that the shape of the factory characteristic curve indicates the sensitivity of the factory to changing CI. A curve with a flatter peak indicates that a wider range of WIP (or CI) will yield optimal objectives, and that a good job mix may be achieved. A curve with a sharper peak is a sign of a sensitive environment, and may indicate the presence of critical and/or bottleneck machines.

Figure 4:
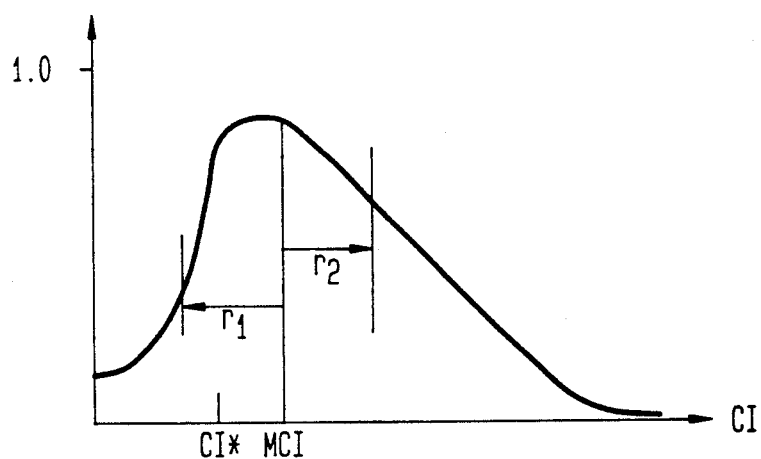
FIG. 4 is a diagram illustrating the time distribution of the continuity index over a range of jobs normally processed by the factory over a predetermined period of time.

In order to determine a range of CI which will allow management objectives to be met, the distribution of CIs for all jobs processed by the factory over a predetermined period of time is calculated. In this way a time distribution of CI may be derived. FIG. 4 represents a distribution of the CIs of all of the jobs processed by the factory over a predetermined period of time according to a predetermined set of management objectives. The CI of each job processed by the factory, is accumulated over the course of a relatively long period of time. The percentage of jobs having that CI is then plotted in FIG. 4. This results in a time distribution curve of CIs of jobs processed by the factory. These data may be gathered either empirically by observing the factory in operation, or may be simulated (which, in this case would be a one-time simulation, and would not have to be repeated when each decision to release a job is made.) From FIG. 4, it can be seen that there is a mean CI, designated MCI for all jobs processed by the factory. The mean CI may be determined by the following equation:

$$MCI = \frac{SUM\ CI}{N} \quad (2)$$

where N is the total number of jobs processed by the factory in the predetermined period of time. This mean CI (MCI) is not necessarily the same as the optimal CI, CI*.

A lower range $r_1$ and an upper range $r_2$, surrounding MCI, may be expressed as a number of standard deviations from the MCI. This lower range ($r_1$) and upper range ($r_2$), which form acceptable CIs for jobs to be released onto the shop floor 30, may be also determined by empirical observation or simulation. It should be understood that $r_1$ could equal $r_2$ and be designated r.

Figure 5:
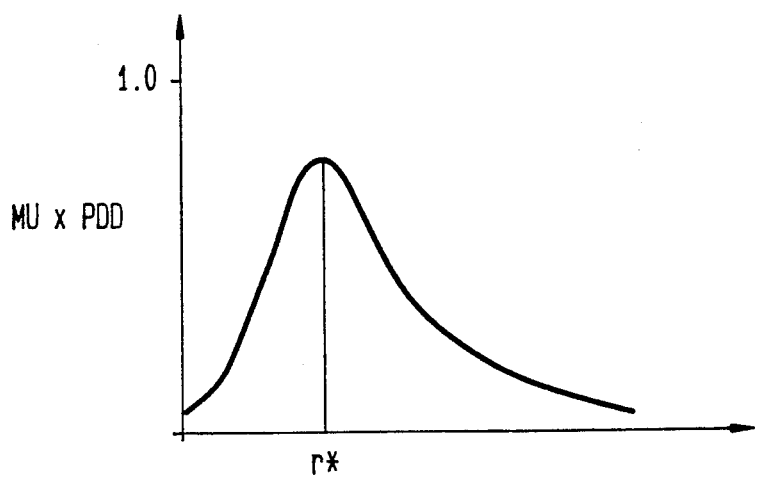
FIG. 5 is a diagram illustrating the relationship of the product of machine utilization and number of jobs on time to the range of acceptable continuity indices.

FIG. 5 shows the relationship of the product of MU×PDD to the range r around MCI. As the range gets smaller (i.e. fewer standard deviations from MCI), fewer jobs are released into the system. This leads to a larger percentage of jobs meeting their due dates, but lower machine utilization. As the range gets larger (i.e. more standard deviations from MCI), more jobs are released into the system. This leads to higher machine utilization but a smaller percentage of jobs meeting their due dates. As is shown in FIG. 5, there is an optimal range r, designated r*, which will maximize the product of MU×PDD. The curve of r versus MU×PDD may be derived from empirical observation, or from simulation. In general terms, optimal values of the lower range $r_1$ and upper range $r_2$ may also be determined, and designated $r_1^*$ and $r_2^*$, respectively.

Thus, in order to determine whether a job from the job pool 10 is to be released onto the shop floor 30, the following comparison is made:

$$MCI - r_1^* \leq CI \leq MCI + r_2^* \qquad (3)$$

for all jobs in the job pool 10. Any job whose CI satisfies this comparison may be released onto the shop floor 30.

Experimental evidence, based upon simulations, indicates that the use of a lot release scheduler operating in accordance with principles of the present invention leads to the following advantages. First, the last job will be released from the factory at the same time as in a factory not using the present invention. In a factory not using the present invention, the average time for an order to be completed increases linearly, or possibly exponentially, with the number of jobs-in-progress. Using the present invention, this time is bounded and approaches a constant value. In a factory not using the present invention, the product of MU×PDD drops very quickly to zero as soon as too many jobs are released. Using the present invention, the product of MU×PDD (with moving due dates) is maintained constantly at an optimal level regardless of the number of jobs-in-progress.

In a factory not using the present invention, the product of MU×PDD (with fixed due dates) drops in the same manner as for moving due dates. Using the present invention, the product MU×PDD drops at a much slower rate. In a factory not using the present invention, the total lateness and average lateness increases exponentially with the number of jobs-in-progress. Using the present invention, the total lateness and average lateness is almost zero. In a factory not using the present invention, the WIP cost can increase exponentially with the number of jobs-in-progress. Using the present invention, the WIP cost is kept constant, regardless of job arrivals. Finally, in a factory not using the present invention, the total cost (WIP, machine idle time, and due date missed) increases exponentially with the number of jobs-in-progress. Using the present invention, this cost drops substantially.

It should be noted that the CIs, and the MCI for the jobs calculated in equations (1) and (2) and comparison (3) may be calculated for a predetermined period of time, designated T. For example, a period of one day may be used. In this case the CI is a measure of how continuously the order would actually be processed during that day, if that job were to be released to the shop floor 30 at that time. The ratio leading to the CI is then modified to be:

$$CI = \frac{\text{Total processing time within } T}{\text{MIN(Total time to complete, } T)} \qquad (4)$$

where the denominator represents the smaller of either the total time to complete the job, or the predetermined amount of time over which CI is being calculated. The mean CI (MCI) and range r are calculated in the same manner as above but based on the CI calculated in equation (4).

It is apparent from the above that MCI and r are dependent upon the operation of the factory and management objectives. So long as these remain constant, these parameters need not be recalculated. In such a case, when the pending jobs in the job pool 10 are evaluated for possible release onto the shop floor 30, only the CI for those jobs need be calculated. If one or more of the jobs meets the criterion of comparison (3), then they are released onto the shop floor 30. It is also apparent, however, that the parameters MCI and r may be determined by empirical observation. If these parameters are so determined, then they may be continually updated based upon the current operation of the factory and the current management objectives. These parameters may also be updated at any desired time.

It should be understood that the lot release scheduler 20 may be a computer system, either central or distributed. Furthermore, the job pool 10 may be implemented in computer form as a data base of information relating to the orders. This data base may reside on the same computer as that of the lot release scheduler 20, or may exist on a different computer. The job pool 10 computer, if separate from the lot release scheduler 20 computer, may be directly linked to the lot release scheduler 20 computer. It should be further understood that the machines 42 to 46 on the shop floor 30, may be computer controlled or computer monitored. The controlling or monitoring computer or computers may be connected directly to the lot release scheduler 20 computer.

What we claim is:

1. A factory for processing jobs-in-progress, and producing completed work, said factory comprising:
    a plurality of machines for receiving and processing ones of said jobs-in-progress and at least a portion of said plurality having waiting queues, said machines providing status information relating to respective ones of said waiting queues;
    a source of orders;
    a source of user-selected job release criteria, said criteria including at least one of a respective utilization factor and a respective job on-time factor assigned to respective ones of said machines;
    storing means, responsive to said source of orders, for storing pending orders, and for releasing a selected order for inclusion in said jobs-in-progress in response to selection information; and
    means, responsive to information from said storing means, to said source of job release criteria and to said machine status information, for producing and revising said selection information so as to cause said selected order to be that order which has the greatest likelihood of achieving any of said utilization factor and said job on-time factor for said ones of said machines.

2. The factory of claim 1, wherein said selection information producing means comprises a computer.

3. The factory of claim 2, wherein said order storing means comprises a data base stored on a computer.

4. The factory of claim 3, wherein said selection information producing means and said order storing means are comprised on the same computer.

5. The factory of claim 4, wherein said machines are controlled by a computer system directly connected to said information producing means and order storing means computer.

* * * * *